United States Patent [19]

Ream et al.

[11] Patent Number: 4,720,125
[45] Date of Patent: Jan. 19, 1988

[54] EXPANSION AND LENGTH ADJUSTMENT JOINT

[75] Inventors: John D. Ream; William J. Blalock, both of Wichita, Kans.

[73] Assignee: Metal-Fab, Inc., Wichita, Kans.

[21] Appl. No.: 945,080

[22] Filed: Dec. 22, 1986

[51] Int. Cl.[4] ............................................. F16L 39/00
[52] U.S. Cl. .................... 285/47; 285/133.1; 285/302; 285/373; 285/346
[58] Field of Search ................ 285/47, 424, 302, 346, 285/367, 133.1, 168, 373

[56] References Cited

U.S. PATENT DOCUMENTS

| | | |
|---|---|---|
| 1,824,422 | 9/1931 | Badger . |
| 2,850,264 | 9/1958 | Grable . |
| 3,186,737 | 6/1965 | Brundage ...................... 285/168 X |
| 3,208,539 | 9/1965 | Henderson . |
| 3,427,051 | 2/1969 | White et al. . |
| 3,544,135 | 12/1970 | Hoerrner . |
| 3,583,730 | 6/1971 | Kozlowski . |
| 3,902,744 | 9/1975 | Stone . |
| 4,029,343 | 6/1977 | Stone . |

FOREIGN PATENT DOCUMENTS 2016627  9/1979  United Kingdom ................ 285/367

Primary Examiner—Dave W. Arola
Attorney, Agent, or Firm—Bill D. McCarthy

[57] ABSTRACT

An expansion and length adjustment joint for use with a double walled metal chimney, the chimney having an inner flue wall and an outer casing wall, the adjustment joint having an inner sliding sleeve with a flange at one end thereof. An upper flue wall connecting band is sealingly disposed around the inner sliding sleeve flange and a flange of the inner flue wall. A gasket retaining collar is secured against the inner sliding sleeve, thus retaining a flue gas seal therealong with thermal expansion.

6 Claims, 2 Drawing Figures

EXPANSION AND LENGTH ADJUSTMENT JOINT

BACKGROUND OF THE INVENTION

1. Field of the Invention.

The present invention relates to a double walled metal chimney having an inner flue wall and outer casing wall, and more particularly but not by way of limitation, to an expansion and length adjustment joint for joining chimney sections.

2. Brief Description of the Prior Art.

Heretofore, there have been a number of different types of double walled metal chimneys with expansion joints, such as the expansion joint described in U.S. Pat. No. 4,029,343 to Stone. This expansion joint, while appearing similar to the present invention, uses an annular gasket supported by, and in sealed engagement with, an inner wall end portion. This joint does not provide the advantages of having a separate gasket retaining collar as described herein. Also, U.S. Pat. No. 1,824,422 to Badger, U.S. Pat. No. 2,850,264 to Grable, U.S. Pat. No. 3,208,539 to Henderson, U.S. Pat. No. 3,427,051 to White et al., U.S. Pat. No. 3,544,135 to Hoerrner, U.S. Pat. No. 3,583,730 to Kozlowski and U.S. Pat. No. 3,902,744 to Stone describe different types of metal chimneys, expansion joints and related metal equipment used in chimneys. None of these prior art patents describes the particularly unique features and advantages of the subject adjustment joint with gasket retaining collar.

SUMMARY OF THE INVENTION

The present invention provides an expansion and length adjustment joint with a separate sliding gasket retaining collar used for holding a graphited or graphite coated gasket to prevent the escape of flue gas from inner flue walls. The joint includes an inner sliding sleeve which engages the gasket and inner circumference of a lower flue wall to provide for the linear thermal expansion of the chimney while providing a positive seal.

The expansion and length adjustment joint eliminates the need during a chimney installation of cutting individual casing and flue walls. Also the subject joint allows for expansion and length adjustment during the expansion of the flue walls.

The invention is rugged in construction, provides a minimum of parts required for an expansion joint and can be easily installed during the installation of chimney sections.

The expansion and length adjustment joint includes a cylindrical inner sliding sleeve having an outwardly extending flange adapted for engagement with a flange extending outwardly from a cylindrical upper flue wall. The flanges are secured together using an upper flue connecting band. The joint further includes a cylindrical gasket retaining collar having an outwardly extending flange used for engagement with an outwardly extending flange of a cylindrical lower flue wall. The flanges are secured together using a lower flue connecting band. The gasket retaining collar further includes an annular groove therearound for receiving a graphited gasket or the like therein. By tightening a gasket compression band the gasket is rigidly secured inside the annular groove and against the outer circumference of the sliding sleeve.

The advantages and objects of the present invention will become evident from the following detailed description of the drawings when read in connection with the accompanying drawings which illustrate preferred embodiments of the invention.

DETAILED DESCRIPTION OF THE DRAWINGS

Figures 1, 1A:
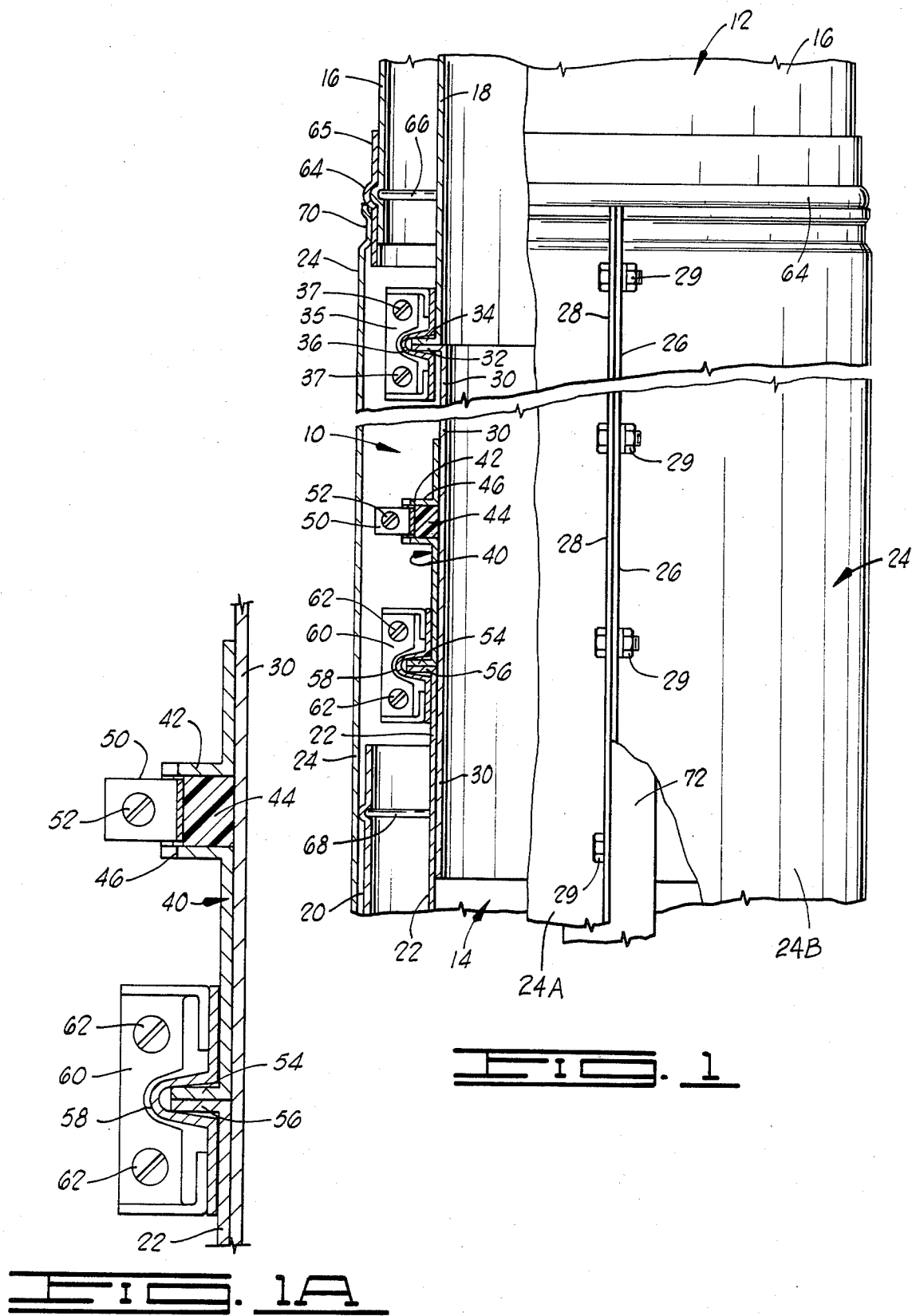
FIG. 1 illustrates a side sectional view of an upper and lower chimney section having inner flue walls and outer casing walls joined together by an expansion and length adjustment joint constructed in accordance with the present invention.
FIG. 1A shows an enlarged side sectional view of the gasket retaining collar and inner sliding sleeve portions of the expansion and length adjustment joint of FIG. 1.

In FIG. 1 an expansion and length adjustment joint is designated by general reference numeral 10. The joint 10 is used for installation between an upper chimney section 12 and a lower chimney section 14. The upper chimney section 12 includes an outer casing wall 16 and an inner flue wall 18. The lower section 14 includes an outer casing wall 20 and an inner flue wall 22. A longitudinally split cylindrical outer casing jacket 24 is disposed about the outer casing walls 16 and 20 as shown. The casing jacket 24 comprises two identical halves, designated 24A and 24B secured together via flanges 26 and 28 disposed on opposite sides of the casing jacket 24 along the longitudinal seam thereof and secured together by bolts 29. (One side of the casing jacket 24 and thus one pair of the flanges 26, 28 are shown in FIG. 1 which is sufficient for the identical details of the opposing side thereof.)

The expansion and length adjustment joint 10 includes a cylindrical inner sliding sleeve 30 which has an outwardly extending radial flange 32 used for engagement against an outwardly extending radial flange 34 at the lower end of the upper flue wall 18. The two radial flanges 32 and 34 are joined together in a tight seal by a circular upper flue wall connecting band 36. The band 36 has a bracket 35 at each of its ends that meet and are secured together via fasteners 37 for tightening the band 36 around the radial flanges 32 and 34.

The inner sliding sleeve 30 extends downwardly and is received past the upper end of the lower flue wall 22 and adjacent the inner circumference of the wall 22. The joint 10 further includes a cylindrical gasket retaining collar 40 which is received around the sliding sleeve 30 and which includes a slotted retaining groove 42 therearound for receiving and retaining a gasket 44. A review of FIG. 1 and FIG. 1A will show that the retaining groove 42 has an angular cross section. The gasket 44 can be a graphited ceramic fiber braid or similar type of gasket, and is compressed against the outer circumference of the sleeve 30 by a compression band 46 which is received in the bottom of the groove 42. The band 46 is tightened via radial brackets 50 which extend outwardly therefrom through a slot in the groove 42, and a fastener 52 secures the radial brackets 50 together. Accordingly, when the sliding sleeve 30 slides lengthwise due to the longitudinal expansion of the chimney sections 12 and 14, flue gas is prevented from escaping from between the outer circumference of the sleeve 30 and the inner circumference of the lower flue wall 22.

In FIG. 1A an enlarged view of the gasket retaining collar 40 is shown with the gasket 44 held in compression against the side of the outer circumference of the sleeve 30 and against the sides of the groove 42. Also shown in this figure is the collar 40 with an outwardly extending radial flange 54 therearound used for engagement against the side of an outwardly extending radial flange 56 at the end of the lower flue wall 22. The two radial flanges 54 and 56 are joined together using a lower flue wall connecting band 58. The band 58 has outwardly extending brackets 60 and metal fasteners 62 for securing the ends of the band 58 together to compress the band around the radial flanges 54 and 56 to provide a tight seal.

Referring back to the joint 10 shown in FIG. 1, the outer casing jacket 24 extends downwardly from the upper casing wall 16 towards the lower casing wall 20. A groove 64 is provided in a collar 65 and fits around a circular bead 66 in the casing wall 16 for an improved lock around the lower end of the wall 16. The inner circumference of the casing jacket 24 at its lower end is received around a similar circular bead 68 disposed around the end of the lower casing wall 20. A groove 70 is formed at the top end of the casing jacket, as shown, the groove 70 being dimensioned to accommodate the thickness of the collar 65 and that of the bead 68 (in the top end portion of the lower casing wall 20) so as to permit jacket casing 24 to remain cylindrically true as the flanges 26, 28 are secured via the bolts 29. As partially shown in FIG. 1, a tongue member 72 is attached along the underside of the flange 28 and is disposed to extend beneath the flange 26 to provide a metal facing seal beneath the longitudinal seam of the casing jacket 24.

Also shown in FIG. 1 is the sliding sleeve 30 with its lower end extending past the upper end of the lower flue wall 22 to provide for expansion and an improved seal to prevent flue gas from escaping from between the inner flue wall 22 and the sliding sleeve 30.

Finally, the upper and lower chimney sections 12 and 14 are interconnected by connectors that connect the inner flue wall 18, the inner flue wall 22, and the interdisposed inner sliding sleeve 30, to the outer casing walls 16 and 20. These connectors are not shown, as such can be of conventional design, such as appropriately disposed strapping; but preferably, the connectors utilized for the expansion and length adjustment joint 10 will be the "J"-shaped expansion clips taught in U.S. Patent Application Ser. No. 945,355, filed on Dec. 22, 1986. Insofar as may be necessary, the disclosure of that patent application is incorporated herein by reference.

It is clear that the present invention is well adapted to carry out the objects and to attain the ends and advantages mentioned herein as well as those inherent in the invention. While a preferred embodiment of the invention has been described for the purposes of this disclosure, numerous changes can be made which will readily suggest themselves to those skilled in the art and which are encompassed within the spirit and scope of the invention disclosed herein and as defined in the appended claims.

What is claimed is:

1. An expansion and length adjustment joint for a metal chimney having an upper and lower chimney section, each of the chimney sections including an outer casing wall and an inner flue wall, the flue walls of the chimney sections having flanges at the ends thereof which extend radially outwardly, the expansion and length adjustment joint comprising:

an inner sliding sleeve cylindrical in shape and having a radial flange at one end therearound, the radial flange of the inner sliding sleeve disposed adjacent to the radial flange of the upper flue wall, the inner sliding sleeve extending downwardly and received adjacent to the inner circumference of the lower flue wall;

an upper flue wall connecting band circular in shape and disposed around the adjacent radial flanges of the inner sliding sleeve and the upper flue wall and securing the radial flanges together in a tight seal;

a gasket retaining collar having an outwardly extending radial flange at one end therearound, the radial flange of the gasket retaining collar disposed adjacent the radial flange of the lower flue wall, the gasket retaining collar further including a groove therearound;

a gasket adapted for receipt in the groove of the gasket retaining collar;

a lower flue wall connecting band circular in shape and disposed around the adjacently disposed radial flange of the gasket retaining collar and the radial flange of the lower flue wall and securing the radial flanges together in a tight seal; and gasket compression means attached to the gasket retaining collar for compressing the gasket therein against the outer circumference of the inner sliding sleeve.

2. The expansion and length adjustment joint of claim 1 wherein the groove of the gasket retaining collar is angular in cross section for receiving a gasket therein, the gasket made of graphite or similar materials.

3. The expansion and length adjustment joint of claim 1 further including a cylindrical outer casing jacket disposed around the inner sliding sleeve in a spaced relationship and secured at one end to the lower end of the upper casing wall and extending downwardly and around the upper end of the lower casing wall.

4. The expansion and length adjustment joint of claim 3 wherein the jacket includes outwardly extending flanges at the end thereof, the flanges secured together with fasteners for securing the jacket to the upper and lower casing walls.

5. An expansion and length adjustment joint for a metal chimney having an upper and lower chimney section, each of the chimney sections including an outer casing wall and an inner flue wall, the flue walls of the chimney sections having flanges at the ends thereof which extend radially outward, the expansion and length adjustment joint comprising:

an inner sliding sleeve cylindrical in shape and having a radial flange at one end therearound, the radial flange of the inner sliding sleeve disposed adjacent to the radial flange of the upper flue wall, the inner sliding sleeve extending downwardly and received adjacent to the inner circumference of the lower flue wall;

an upper flue wall connecting band circular in shape and disposed around the adjacent radial flanges of the inner sliding sleeve and the upper flue wall and securing the radial flanges together in a tight seal;

a gasket retaining collar having an outwardly extending radial flange at one end therearound, the radial flange of the gasket retaining collar disposed adjacent the radial flange of the lower flue wall, the gasket retaining collar further including a groove therearound;

a gasket adapted for receipt in the groove of the gasket retaining collar;

a lower flue wall connecting band circular in shape and disposed around the adjacently disposed radial flange of the gasket retaining collar and the radial flange of the lower flue wall and securing the radial flanges together in a tight seal;

gasket compression means attached to the gasket retaining collar for compressing the gasket therein against the outer circumference of the inner sliding sleeve;

a longitudinally split cylindrical outer casing jacket;

fastener means for securing the outer casing jacket around the inner sliding sleeve in a spaced relationship and for securing it at one end thereof about lower end of the upper casing wall and about the upper end of the lower casing wall.

6. The expansion and length adjustment joint of claim 5 wherein the gasket compression means includes a compression band received in the groove in the gasket retaining collar and disposed adjacent the gasket, the compression band having outwardly extending radial brackets at the ends thereof, the brackets joined together by a fastener for compressing the compression band against the gasket and tightening the gasket retaining collar around the inner sliding sleeve.

* * * * *